(12) United States Patent
Heath

(10) Patent No.: US 10,465,917 B2
(45) Date of Patent: Nov. 5, 2019

(54) SYSTEM, APPARATUS AND METHOD FOR HEATING HOMES AND OTHER BUILDINGS

(71) Applicant: Heath Mechanical Services, LLC, Cheltenham, PA (US)

(72) Inventor: Douglas L. Heath, Cheltenham, PA (US)

(73) Assignee: Health Mechanical Services, LLC, Cheltenham, PA (US)

( * ) Notice: Subject to any disclaimer, the term of this patent is extended or adjusted under 35 U.S.C. 154(b) by 0 days.

(21) Appl. No.: 15/879,497

(22) Filed: Jan. 25, 2018

(65) Prior Publication Data

US 2018/0209664 A1 Jul. 26, 2018

Related U.S. Application Data

(60) Provisional application No. 62/450,839, filed on Jan. 26, 2017.

(51) Int. Cl.
| | |
|---|---|
| *F24D 3/10* | (2006.01) |
| *F24D 1/00* | (2006.01) |
| *F24D 19/08* | (2006.01) |
| *F22B 7/12* | (2006.01) |

(52) U.S. Cl.
CPC ........... *F24D 3/1058* (2013.01); *F24D 1/005* (2013.01); *F24D 19/08* (2013.01); *F22B 7/12* (2013.01); *Y02B 30/16* (2013.01)

(58) Field of Classification Search
CPC .......... F22B 29/02; F22B 37/34; F22B 37/28; F24D 3/02; F24D 3/1058; F24D 3/1075; F24D 11/002; F24D 11/004; F24D 19/083; F24D 19/088
See application file for complete search history.

(56) References Cited

U.S. PATENT DOCUMENTS

| 3,766,574 A | * | 10/1973 | Smid, Jr. | ................. E04C 2/521 206/321 |
|---|---|---|---|---|
| 5,196,125 A | * | 3/1993 | O'Brien | ................. A01G 25/06 210/170.08 |
| 5,647,977 A | * | 7/1997 | Arnaud | ..................... C02F 9/00 134/111 |
| 5,738,131 A | * | 4/1998 | Wiley | ....................... E03B 9/12 137/15.09 |
| 6,286,877 B1 | * | 9/2001 | Mendoza | ............... F16J 15/164 285/351 |

(Continued)

*Primary Examiner* — Gregory A Wilson
(74) *Attorney, Agent, or Firm* — Mark T. Vogelbacker; Eckert Seamans Cherin & Mellott, LLC

(57) ABSTRACT

A heating system includes a first pipe portion configured to connect to piping that returns water from a heat exchanger in a building back to a boiler in the building. A longitudinal axis of the first pipe portion can extend vertically. A second pipe portion can have a first end, a second end, and a longitudinal axis extending therebetween. The first end of the second pipe portion can be configured to connect to piping that supplies water to the heat exchanger. The second end of the second pipe portion can be configured to connect to the second end of the first pipe portion. The longitudinal axis of the second pipe portion can extend parallel to the longitudinal axis of the first pipe portion. The second pipe portion can be spaced-apart from the first pipe portion. The system can be in the form of an installation kit for a heating appliance.

20 Claims, 10 Drawing Sheets

(56) References Cited

U.S. PATENT DOCUMENTS

| | | | | |
|---|---|---|---|---|
| 6,546,898 B1* | 4/2003 | Rocheleau | ............ | F24D 3/1058 |
| | | | | 122/235.29 |
| 6,557,774 B1* | 5/2003 | Krueger | .................... | F24D 3/02 |
| | | | | 237/66 |
| 7,191,789 B2* | 3/2007 | Corbett, Jr. | ........... | F24D 3/1058 |
| | | | | 137/15.01 |
| 8,316,886 B2* | 11/2012 | Olsen | ....................... | F16K 11/22 |
| | | | | 137/597 |
| 2010/0031979 A1 | 12/2010 | Olsen et al. | | |
| 2010/0319795 A1 | 12/2010 | Olsen et al. | | |
| 2015/0097515 A1* | 4/2015 | Pargas | .................. | H01L 41/113 |
| | | | | 320/107 |
| 2015/0122345 A1* | 5/2015 | Sorensen | ............ | F04D 15/0016 |
| | | | | 137/88 |
| 2017/0363300 A1* | 12/2017 | Hofer | ........................ | F24D 3/02 |
| 2018/0180298 A1* | 6/2018 | Abbing | .................... | E03B 7/045 |
| 2018/0209664 A1* | 7/2018 | Heath | .................... | F24D 3/1058 |
| 2018/0266704 A1* | 9/2018 | Markow | ................ | F24H 3/0411 |

* cited by examiner

Connects to 50 and/or 52

Connects to 30b

SYSTEM, APPARATUS AND METHOD FOR HEATING HOMES AND OTHER BUILDINGS

CROSS-REFERENCE TO RELATED APPLICATION

The present application claims the benefit of U.S. Provisional Application No. 62/450,839, filed Jan. 26, 2017 and entitled "Heating Boiler Apparatus, Piping Configuration, and Method of Using and Installing Same," the disclosure of which is herein incorporated by reference.

BACKGROUND

Heating systems for homes and other buildings are well known. One such prior art system is disclosed in U.S. Publication No. 2010/0319795, the disclosure of which is hereby incorporated by reference. Hot water heating systems are among one of the oldest types of heating systems. Many buildings that include hot water heating systems are over one hundred years old. The piping in the wall(s) and/or floor(s) that transports the heated water to heat the building is generally a permanent part of the building structure.

The boiler or heating equipment that provides the heat to the water is typically replaceable and has changed significantly since the time the piping system was installed in these old buildings. Most buildings have seen a number of boiler replacements. These replacement boilers come with any number of warnings and manufacture recommendations as to how each boiler is to be installed and with what components. Despite these warnings and recommendations, it is rare to find a replacement boiler unit with all the necessary parts installed correctly in one of these old heating systems.

During the early years of hot water heating systems, over 150 years ago, technologies were new and materials were less costly. Prior art heating systems included large cast iron radiators throughout the building, as well as large cast iron boilers that heated the water for these systems.

Early on, the properties of physics controlled the design of the large cast iron hot water boilers, as the design depended on the heat to rise though the piping by gravity to get to the radiators on the floor(s) above. The design of the piping and sizing of the radiators in a gravity hot water system is much different than how system piping is designed and boilers are manufactured in modern times.

World War II was significant to the evolution of the modern hot water boiler. During this time, materials, such as steel and iron, were rationed and in limited supply because they were needed for the war effort. Manufactures needed to redesign boilers to use less material, such as steel and cast iron, and still provide an effective amount of heat for buildings. In addition, manpower was limited as well, as many of the young men trained in this industry were off to war. Before this time, boilers were shipped to buildings in pieces, large sections of cast iron were transported through doorways by manpower and into basements and boiler rooms, and then assembled into massive boilers made from a significant amount of cast iron.

With the limiting of raw materials, the size of boilers became smaller. Circulator pumps began to be common on the hot water piping on the supply side of the boiler instead of relying on gravity. It was a time of trial and error for the industry; the pump seals did not last long with the high temperature of the water leaving the boiler. Metals and manpower continued to be in limited supply. In addition, there was increased demand for more product due to the aging systems that came due for replacement and the housing boom after the war.

Soon, the industry began to make the prepackaged boilers, completely assembled, small enough to fit through doorways, and light enough to be transported as a complete unit. All controls were factory installed. The circulator pumps were moved to the wrong side, intentionally, to return piping side of the boiler to keep away from the hottest water. Systems were required to be pressurized to keep temperatures lower, and now only a few moderately trained workers were needed to install a replacement boiler.

Presently, when many years of boiler replacements have been completed since the 1940's, and those generations of engineers, system designers, and installers have long since gone from the industry. For years, boiler replacements have been done by installers who have been looking at the examples of what they find in these buildings. New generations of installers have been trained over and over by these examples: circulators in the wrong locations, water fill into a wrong section of piping, expansion tanks improperly placed on piping, no way to get air out of piping, and/or no way to add cleaner and additives to the water. These are just a few of the problems with most prior art hot water system found in buildings.

The problems still continue today, as prior art replacement boilers are installed much the way the installers find them. It was only a few years ago, after the new technologies of high efficient heating started to become more prevalent, that manufactures announced that it was wrong to put the circulator pump on the return piping side of the boiler (the way it had been done for 50 years), but instead should be installed on the hot supply side of the boiler. Now, circulators are not part of the prepackaged boiler, or they come unattached with instructions of preferred placement on the supply water piping.

Every boiler replacement has, at least in part, its own unique circumstance to connect to the system components, such as the piping and radiators, which are permanently installed in buildings. All boilers manufactured and sold in the U.S. must meet government set guidelines for a certain level of energy efficiency. Unfortunately, these new efficiencies are not being maintained at the installation level. In many circumstances, the life of the heating appliance is jeopardized by incorrect installation. In the end, it is the building and homeowners that ultimately loose—they have heat when a replacement boiler is installed, but they are not seeing the benefits of energy savings they could have, their maintenance costs are higher, and the life of the replacement boiler has been shortened.

Prior art boiler replacement involves lining up the connections of the new boiler with the connection points of the building and putting the piping together. In the prior art, components, such as circulators and valves, as well as many other recommended components, were fitted into these sections of piping anywhere they would fit. No installation was the same; one could only guess if all of the flow requirements that dictate heating capacity were met, and when the time comes to replace the boiler again all the piping and components would be removed with the old boiler and the same thing would be done again (i.e., lining up the different connection points of the building's piping and the connections of the boiler and connect them together).

BRIEF SUMMARY

In one embodiment, the present disclosure is directed to a heating system for a building. The heating system can include a first pipe portion having a first end, an opposing second end, and a longitudinal axis extending therebetween. The first end of the first pipe portion can be configured to connect to piping that returns water from a heat exchanger in a building to a boiler in the building. The longitudinal axis of the first pipe portion can extend vertically. A second pipe portion can have a first end, an opposing second end, and a longitudinal axis extending therebetween. The first end of the second pipe portion can be connected to piping that supplies water to the heat exchanger. The second end of the second pipe portion can be configured to connect to the second end of the first pipe portion. The longitudinal axis of the second pipe portion can extend parallel to the longitudinal axis of the first pipe portion. The second pipe portion can be spaced-apart from the first pipe portion. A small or short section of piping and a valve can be located proximate the second end of the first pipe portion. The valve can be configured to allow at least one of sediment and liquid to be removed from the first pipe portion. A port can be located proximate the first end of the second pipe portion. The port can be configured to allow at least one of (i) gas to be removed from the second pipe portion and (ii) fluid (e.g., chemical liquid, non-gaseous substances, concentrated gel, powder, etc.) to be added to the second pipe portion. The connection of the first pipe portion to the second pipe portion can allow the first pipe portion to be adjusted during assembly with respect to the second pipe portion about a vertical axis.

In a further embodiment, the present disclosure is directed to a heating system for a building. The heating system can include at least one heat exchanger within a first room of a building. A boiler can be positioned in a second room of the building. The boiler can be configured to heat water. A first pipe portion can have a first end, an opposing second end, and a longitudinal axis extending therebetween. The first end of the first pipe portion can be configured to connect to piping that returns water from the heat exchanger to the boiler. The longitudinal axis of the first pipe portion can extend vertically. A second pipe portion can have a first end, an opposing second end, and a longitudinal axis extending therebetween. The first end of the second pipe portion can be connected to piping that supplies water to the heat exchanger. The second end of the second pipe portion can be configured to connect to the second end of the first pipe portion. The longitudinal axis of the second pipe portion can extend parallel to the longitudinal axis of the first pipe portion. The second pipe portion can be spaced-apart from the first pipe portion. A small or short section of piping and a valve can be located proximate the second end of the first pipe portion. The valve can be configured to allow at least one of sediment and liquid to be removed from the first pipe portion. A port can be located proximate the first end of the second pipe portion. The port can be configured to allow at least one of (i) gas to be removed from the second pipe portion and (ii) fluid (e.g., chemical liquid, non-gaseous substances, concentrated gel, powder, etc.) to be added to the second pipe portion. The connection of the first pipe portion to the second pipe portion can allow the first pipe portion to be adjusted during assembly with respect to the second pipe portion about a vertical axis.

In yet a further embodiment, the present disclosure is directed to a heating system for a building. The heating system can include a first pipe portion having a first end, an opposing second end, and a longitudinal axis extending therebetween. The first end of the first pipe portion can be configured to connect to piping that returns water from a heat exchanger in a building to a boiler in the building. The longitudinal axis of the first pipe portion can extend vertically. A second pipe portion can have a first end, an opposing second end, and a longitudinal axis extending therebetween. The first end of the second pipe portion can be connected to piping that supplies water to the heat exchanger. The second end of the second pipe portion can be configured to connect to the second end of the first pipe portion. The longitudinal axis of the second pipe portion can extend parallel to the longitudinal axis of the first pipe portion. The second pipe portion can be spaced-apart from the first pipe portion.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings various illustrative embodiments. It should be understood, however, that the invention is not limited to the precise arrangements and instrumentalities shown. In the drawings.

DETAILED DESCRIPTION OF THE INVENTION

Figure 1:
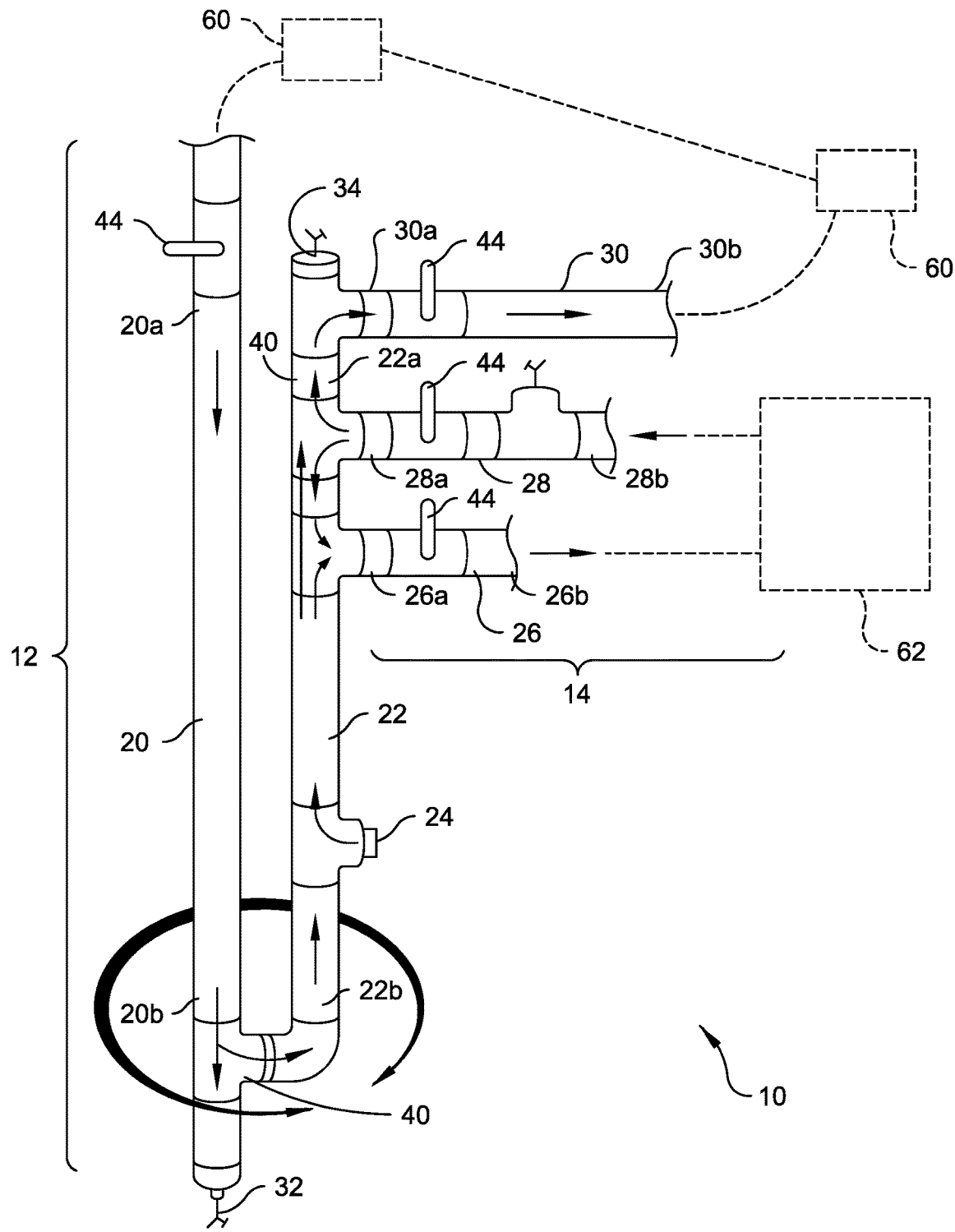
FIG. 1 is a perspective view of at least a portion of a system or apparatus according to an embodiment of the present disclosure.

Certain terminology is used in the following description for convenience only and is not limiting. The words "bottom," "top," "left," "right," "lower" and "upper" designate directions in the drawings to which reference is made. Unless specifically set forth herein, the terms "a," "an" and "the" are not limited to one element but instead should be read as meaning "at least one." The terminology includes the words noted above, derivatives thereof and words of similar import. Unless otherwise stated, the word "connect" (or any variation thereof) covers both direct and indirect connections (e.g., where two pipes are said to be connected, one or more joints and/or additional pipes can be used to make that connection). An "isolation valve" can include, but is not limited to, a ball valve. The word "system" is broadly defined herein to include an entire heating system of a building, including one or more boilers, radiators, heat exchangers, such as in a kit.

In one embodiment, the presently disclosed technology includes an apparatus or system including an assembly of pipe(s) and fittings, made of copper or steel, for example, or any combination thereof. The apparatus or system can be put together by an installer following detailed assembly instructions. A kit can include the proper instructions for, number of and/or size of service valves, maintenance components and performance components. The apparatus or system can be adjusted to connect to any boiler, with all required components, necessary to meet or exceed any installation standards, within the kit. The kit can be assembled using various pipe diameter sizes required by any application. The kit can be modular so that one or more of the components can be positioned as needed for any different application. Additional components can be easily incorporated into the apparatus or system, and additional zones of heating can be added as needed by any application.

In one embodiment, the apparatus or system can include a vertical manifold with a sediment trap to capture and/or allow for manually draining-off heavy particles that are normal to hot water systems, which can build up inside internal components of the piping and boiler, often causing failure and inefficient heating. Additionally, the vertical manifold can incorporate a main purge or charge port which can allow for purging of air as well as adding a chemical additive to the piping and boiler water system. A hot water boiler system is a sealed system under pressure. The purge/charge port, in combination with the correct or a specific placement of isolation valves, can allow for isolation of a section of piping so that it can be depressurized and drained off to allow for one or more chemical additives to be easily added to the system. The purge function of the port can allow for evacuation of unwanted air that is trapped within the boiler and/or piping during service and repair procedures and is placed at the uppermost portion of the vertical manifold to expel air bubbles as they rise to the top of the vertical column of piping.

The vertical manifold can utilize or include a piping configuration or a swing joint (e.g., at the top and/or bottom of the vertical piping column), which can be adjusted and/or manipulated before permanent positioning (e.g., in a house or building) to adjust the return piping or component manifold in a direction or position best suited to make connection with the location of the permanently installed system piping of the building.

In one embodiment, the apparatus or system includes the vertical manifold and/or a component manifold with any additional components or heating zone portions that would form a complete near boiler piping arrangement assembled at the installation site by the installation professional, providing a uniform assembly configuration, which can ultimately provide measurable performance of any boiler installation by using the same configuration for all applications. In one embodiment, the component manifold can be the horizontal section(s) that connects to an uppermost top fitting tee of the vertical manifold. In one embodiment, what is unique about the component manifold is that is has consolidated all the basic functional components of a boiler heating system into a single section that attaches to the vertical manifold and completes the apparatus into the required near boiler piping of any hydronic heating system. It can be assembled from standard industry components as intended by the various manufactures.

In the prior art, there is a likely chance of error or omission with a boiler replacement, which leaves the building or homeowner with higher risks of premature boiler failure, unnecessary maintenance costs, and possible reduced heating performance. In any given boiler installation or replacement, there are normally a lot of unknowns, such as where will all these components fit in the given space of the site, pipe sizes, exact flow requirements of the system piping, and heat exchangers, etc. All of these unknowns fall on the shoulders of the installer when it comes to the boiler replacement.

The component manifold assembly of the presently disclosed technology can allow the installer to build all the required and performance components into the system without the error of misplaced or missing critical components. In one embodiment, once the vertical manifold and component manifold are complete and/or installed in accordance with the instructions, the installer only needs to be concerned with the connection points at the component manifold and vertical manifold to the corresponding connection points of the system piping permanently installed in the building. Use of the apparatus or system made up of the two or more modular manifolds, namely the vertical manifold and the component manifold, can allow the installer, system designer, engineer, and building owner to be confident that all necessary components are present and in correct locations. In addition, the presently disclosed technology can provide the installer, system designer, engineer and building owner to gain a realistic or exact cost of the required materials for any boiler replacement, with significant reduction of installation time and labor costs as compared to prior art systems and installations.

In one embodiment, the apparatus or system can provide a standardized assembly that can be built for any boiler replacement or installation application. Prior to the presently disclosed technology, the industry had little or no standardization with regards to installation or even manufacturing of the boiler appliance. In the prior art, component manufacturers may even have had their own separate requirements. In one embodiment of the present disclosed technology, the apparatus or system can have the adjustability to be adapted to any application. For example, adjustments can be made at the installation site for best fit, and function can be fine-tuned and adjusted to help the new replacement boiler overcome any unknowns of the piping system installed in the building.

Prior art boiler replacement involves lining up the connections of the new boiler with the connection points of the building and putting the piping together. In the prior art, components, such as circulators, valves, and others, would be fitted into these sections of piping anywhere they would fit. No installation was the same, one could only guess if all the flow requirements were met and when time came to replace the boiler again all this piping and components were removed with the old boiler and the same thing was done again.

By using the vertical manifold and component manifold of one embodiment of the presently disclosed technology, a proven piping assembly is provided that includes all the necessary components. This assembly, once installed, can remain as a permanent part of the buildings' heating system. When the time comes to replace the heating boiler, only the boiler would need to be changed. Any components that needed to be updated could be removed from the component manifold and replaced easily.

In one embodiment, the assembly can be marketed to contractors who install boilers, as well as building and homeowners who would make the final decision on replacement. Installers can learn how to properly install boilers from using and seeing the assemblies of the presently disclosed technology in the field. By standardizing the installation aspect of replacement or new boiler heating systems with the apparatus or combination described herein, all parties involved could benefit. For example, manufactures can be more confident that their products are being installed competently to the end user, who would have the confidence in the investment they make for a new boiler as well as all those in between.

Referring to the drawings in detail, wherein like numerals indicate like elements throughout, FIGS. 1-12 illustrate various embodiments of systems, apparatuses and methods for heating a building or at least one or more rooms of the building. The presently disclosed technology can allow at least certain piping components, when installing a replacement boiler or new boiler, to be arranged in a compact configuration, thereby conserving space or creating a more compact piping arrangement. In addition or alternatively, the presently disclosed technology can also reduce the likelihood that at least certain piping components are inadvertently omitted or improperly used when installing a replacement boiler. The presently disclosed technology would have a measurable standard, unlike the inefficiently configured prior art installation, thereby maintaining the efficiency of the boiler, and increasing the performance of the entire system.

The presently disclosed technology can include or be attached to at least one heat exchanger within a first room of a building. The heat exchanger is not limited to a particular form. For example, the heat exchanger could be a radiator, convector or baseboard heater. The presently disclosed technology can include or be attached to a plurality of spaced-apart heat exchangers, wherein one or more of the plurality can be located in separate rooms of the building. The presently disclosed technology can also include or be attached to one or more boilers. The boiler(s) is/are not limited to a particular form. For example, each boiler can be a modulating, condensing (mod-con) boiler, which can be wall-hung or mounted, and/or floor standing (i.e., placed on the floor or ground). Alternatively, each boiler can be a large mass, cast iron boiler. The boiler(s) can be located or positioned in a separate room (e.g., a second room) from one or more of the heat exchangers. The boiler can be configured to heat water.

In one embodiment, the system, generally designated 10, can include at least one of the vertical manifolds, generally designated 12, and at least one of the horizontal manifolds, generally designated 14. The vertical and horizontal manifolds can be operatively and/or generally permanently connected, such as by threaded connection, adhesive, thermal bonding, or any other mechanical means. The system can include a plurality of interconnected pipe portions. In one embodiment, one or more of the pipe portions can have a circular cross-section and can extend linearly or straight. In another embodiment, one or more of the pipe portions can have an alternative cross-section and can include one or more elbows, such that the pipe portions extend in at least a first direction and a second direction that extends at an angle (e.g., 90 degrees) to the first direction.

In particular, the system can include a first pipe portion 20 having a first or upper end 20a, an opposing second or lower end 20b. In one embodiment, a longitudinal axis can extend between the first end 20a and the second end 20b of the first pipe portion 20. The first end 20a of the first pipe portion 20 can be configured to connect to piping that returns water from the one or more heat exchangers 60 to the boiler(s) 62. The longitudinal axis of the first pipe portion can extend vertically, at least substantially vertically (i.e., +/− approx. 10 degrees) or perpendicularly to the ground surface or a first floor of the building.

Figure 2:
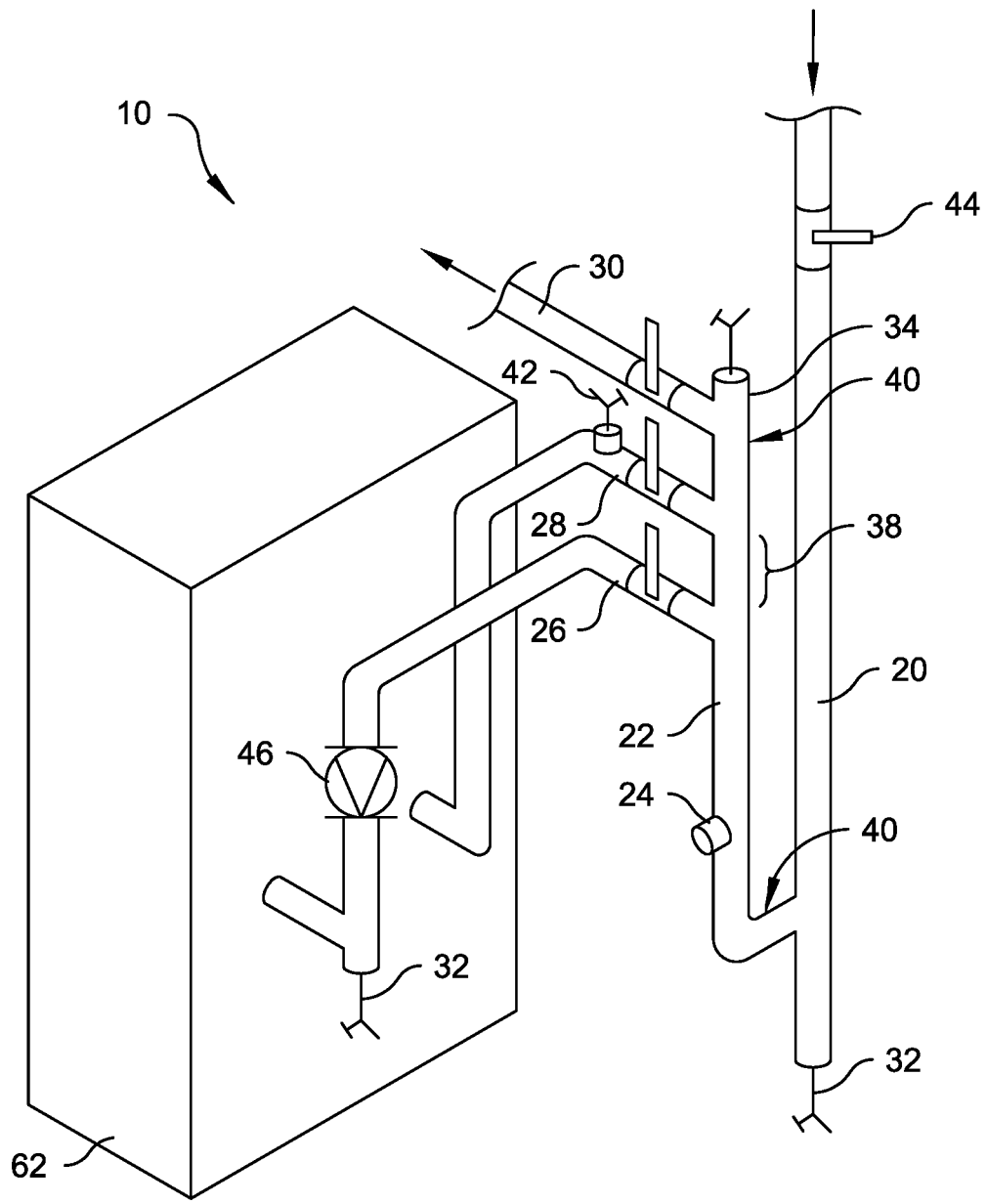
FIG. 2 is a perspective view of at least a portion of a system or apparatus according to an embodiment of the present disclosure.
Figure 3:
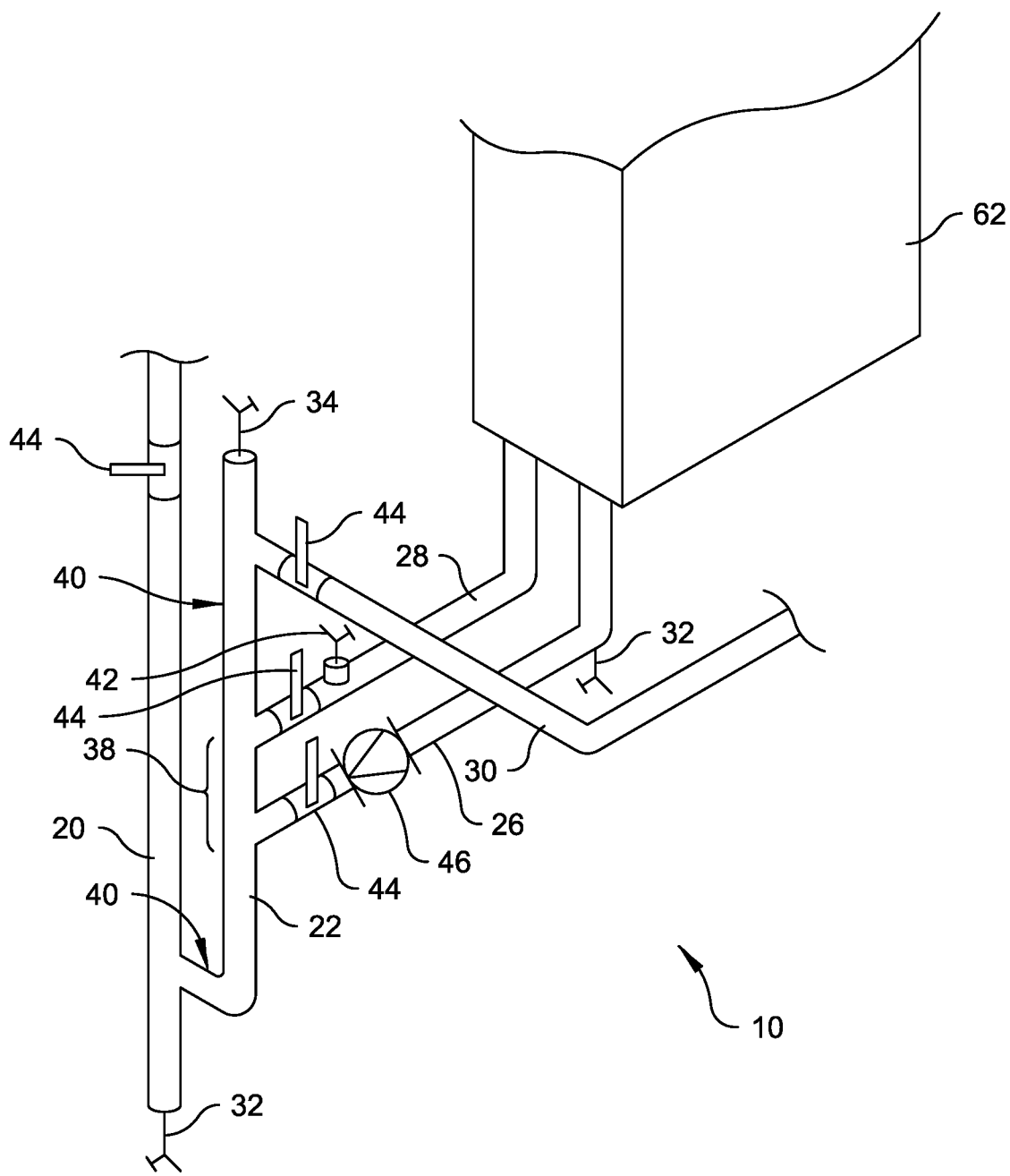
FIG. 3 is a perspective view of at least a portion of a system or apparatus according to an embodiment of the present disclosure.

The system can include a second pipe portion 22 can have a first or upper end 22a, an opposing second or lower end 22b. In one embodiment, a longitudinal axis can extend between the first end 22a and the second end 22b of the second pipe portion 22. The first end 22a of the second pipe portion 22 can be connected to piping that supplies water to the one or more heat exchangers 60. The second end 22b of the second pipe portion 22 can be configured to connect to the second end 20b of the first pipe portion 20. As shown in FIG. 1, the connection of the first pipe portion 20 to the second pipe portion 22 can allow the first pipe portion 20 to be adjusted in a desired or best position (e.g., rotate or spin) with respect to the second pipe portion 22 about a vertical axis VA before being permanently connected into desired location as required by the specific application. For example, as shown in FIGS. 2-3, a swing joint 40 can be used to connect the second end 20b of the first pipe portion 20 to the second end 22b of the second pipe portion 22. In one embodiment, the swing joint 40 can allow the first pipe portion 20 to be adjusted in the range of approximately 270 degrees with respect to the second pipe portion 22. This configuration allows the system 10 to accommodate and/or adapt to the existing space provided for the boiler(s) 62, such as a corner of a basement. Another swing joint 40 can be used to attach the first end 22a of the second pipe portion 22 to another section of the system (e.g., a fifth pipe portion 30, as described in detail below) in another direction as required by the application in order to position the components for a desired or best fit at the installation site.

In one embodiment, the swing joint can include a T-joint or an L-joint. The swing joint permits the installer additional design flexibility, as the exact positioning of the first pipe portion 20 with respect to the second pipe portion 22 can be modified to accommodate the spacing needs, for example, of the particular building. Thus, the swing joint allows selective adjustability in the connection of the building return water piping to the vertical manifold attached to the boiler. The same rationale applies to the first end 22a of the second pipe portion and any other section of the system (e.g., a fifth pipe portion 30, as described in detail below) to which it connects.

The longitudinal axis of the second pipe portion 22 can extend parallel (which is defined herein as exactly or substantially parallel (i.e., +/− approx. 10 degrees)) to the longitudinal axis of the first pipe portion 20 and/or the vertical axis VA. The second pipe portion 22 can be spaced-apart from the first pipe portion 20. The lateral distance (i.e., perpendicular to the vertical axis VA) between the first and second pipe portions 20, 22 can depend upon the particular arrangement or installation in any given building. One example of a range for which the first pipe portion 20 can be spaced-apart from the second pipe portion is a minimum of two includes to an unlimited max, but usually within 16 inches, as space requires.

Referring to FIGS. 1, 2, 4, 5, 8A and 8B, the second pipe portion 22 can include a connection tap 24 between the first and second ends 22a, 22b thereof. The connection tap 24 can provide a return port that would allow connection for future or present technologies of heating domestic hot water (DHW) with an indirect water heater. DHW can refer to water used, in any type of building, for domestic purposes, mainly drinking, food preparation, sanitation and personal hygiene (but not including space heating, swimming pool heating, or use for industrial process). In one embodiment, the connection tap 24 can be a joint (e.g., a T-joint) in or near a midsection of the second pipe portion 22. The connection tap 24 can allow fluid to enter the second pipe portion 22, or the connection tap 24 could be plugged if not used at the time of install. Alternatively, the connection tap 24 can be used for boiler return water connection in some applications with a large mass cast iron boiler.

In one embodiment, the system can include a third pipe portion 26 having a first end 26a, an opposing second end 26b. In one embodiment, a longitudinal axis can extend between the first end 26a and the second end 26b of the third pipe portion 26. The first end 26a of the third pipe portion 26 can be configured to connect to the second pipe portion 22. The second end 26b of the third pipe portion 26 can be configured to connect to the return port or connective tapping of one or more boilers 62. At least a portion of the third pipe portion 26 can be positioned above or below at least a portion of the boiler(s) 62. In one embodiment, the longitudinal axis of the third pipe portion 26 can extend perpendicularly (which is defined herein as exactly or substantially perpendicularly (i.e., +/− approx. 10 degrees)) to the longitudinal axis of the second pipe portion 22 and/or the vertical axis VA.

Figure 4:
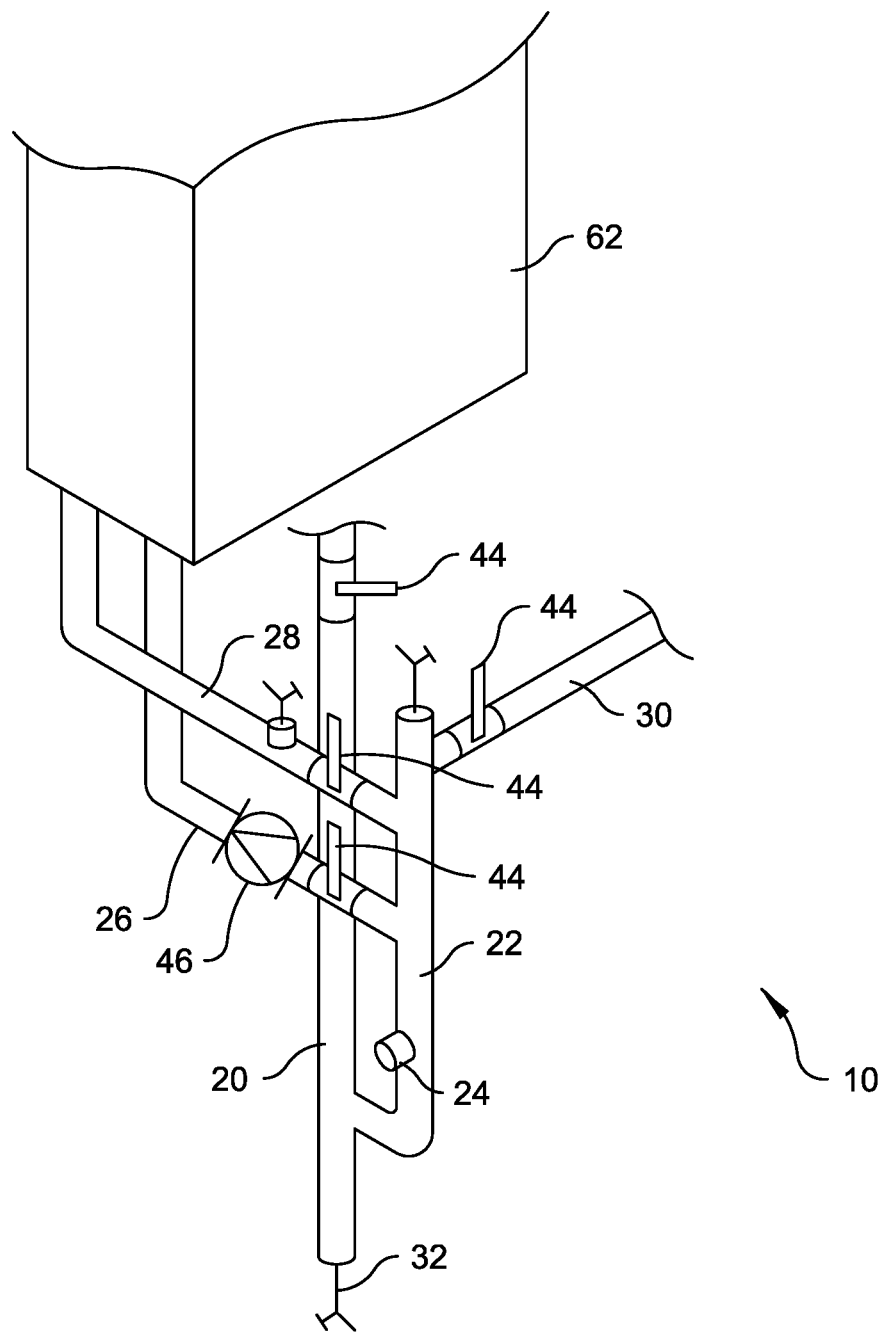
FIG. 4 is a perspective view of at least a portion of a system or apparatus according to an embodiment of the present disclosure.
Figure 5:
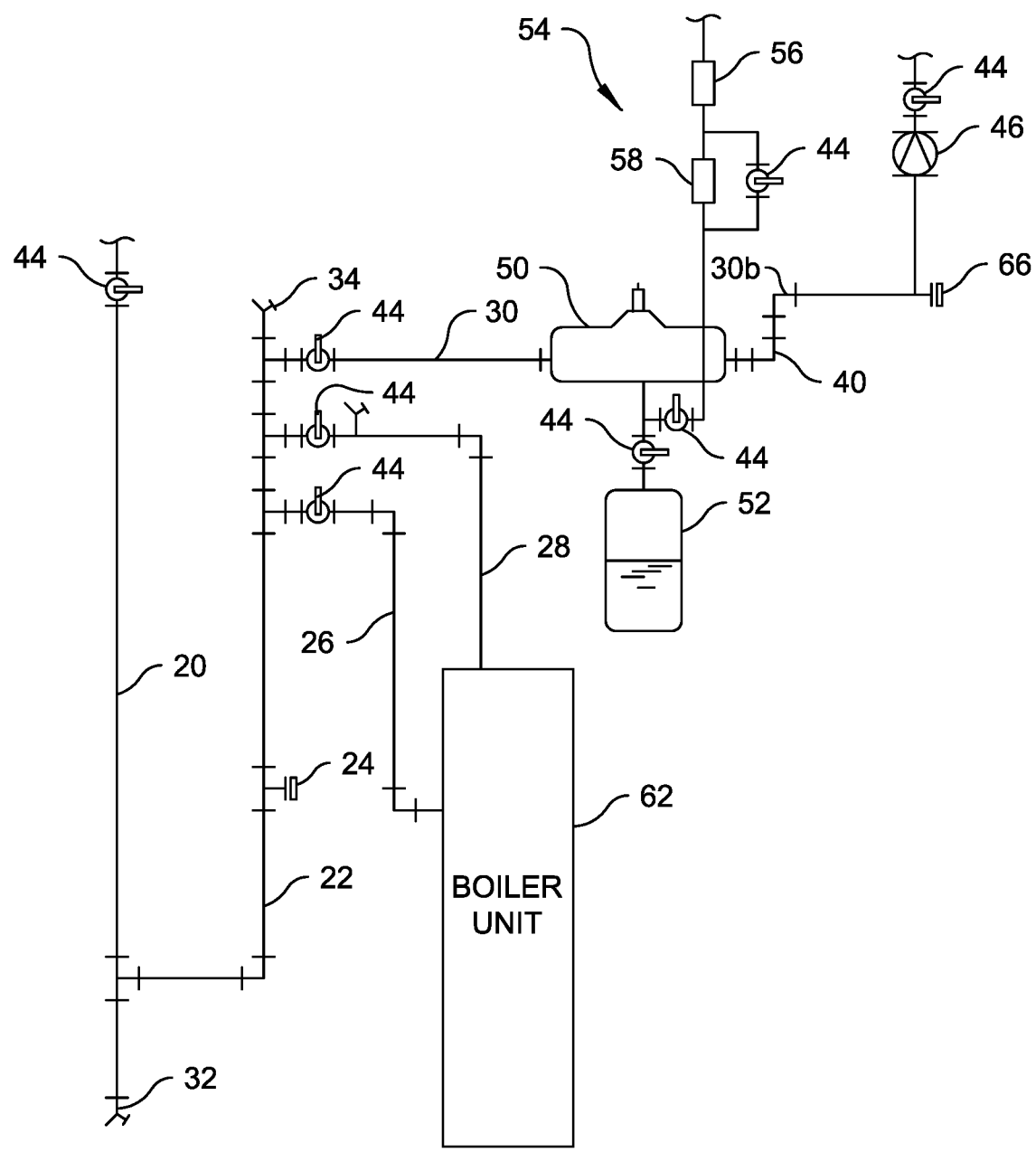
FIG. 5 is a schematic diagram of at least a portion of a system or apparatus according to an embodiment of the present disclosure.
Figure 12:
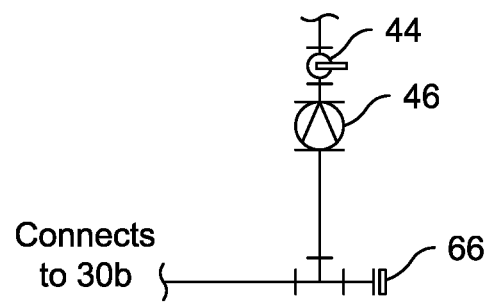
FIG. 12 is an enlarged schematic diagram of a zone piping and circulator assembly, which can form at least a component of the kit.

Referring to FIGS. 2-4, the third pipe portion 26 can include or be attached to at least one circular pump 46. The circular pump 46 can force or pull water from the second pipe portion 22 to travel to the boiler(s) 62 through the third pipe portion 26 so as to be reheated at the required flow rate or pumping speed. At least circulation pump 46 can also form part of the zone piping and circulation assembly, as shown in FIGS. 5 and 12. The zone piping and circulation assembly can also include a plug 66 (see FIGS. 5 and 12) at one end thereof. If the building or heating system includes a second zone, the plug 66 can be removed or separated from the zone piping and circulation assembly, and a second, identical zone piping and circulation assembly can be attached at this point. Additional zone piping and circulation assemblies can be added for each additional zone. Referring to FIG. 8B, one embodiment of the boiler arm assembly can include a loop purge tee or valve 64 within the second pipe portion 22 and between the third and fourth pipe portions 26, 28.

The system 10 can also include a fourth pipe portion 28 having a first end 28a, an opposing second end 28b. In one embodiment, a longitudinal axis can extend between the first end 28a and the second end 28b of the fourth pipe portion 28. The first end 28a of the fourth pipe portion 28 can be configured to connect to one distinct point in the system 10. In one embodiment, a connection point of the first end 26a of the third pipe portion and the first end 28a of the fourth pipe portion 28 to the pipe portion 22 would be commonly referred to as "closely spaced tees" (and would provide hydraulic separation), as described in more detail below. In one embodiment (see FIG. 1), the first end 28a of the fourth pipe portion 28 can connect to the second pipe portion 22 at a position at least slightly spaced-above the point where the first end 26a of the third pipe portion 26 connects to the second pipe portion 22.

The fourth pipe portion 28 can be spaced-apart from the third pipe portion 26. In one embodiment (see FIGS. 1, 5, 6, 8A, 8B and 8C), the longitudinal axis of the third pipe portion 26 can extend parallel to the longitudinal axis of the fourth pipe portion 28. A temperature of water within the third pipe portion 26 can be less than a temperature of water in the fourth pipe portion 28.

In one embodiment, the system can include a fifth pipe portion 30 having a first end 30a, an opposing second end 30b. In one embodiment, a longitudinal axis can extend between the first end 30a and the second end 30b of the fifth pipe portion 30. The first end 30a of the fifth pipe portion 30 can be configured to connect to the first end 22a of the second pipe portion 22. The second end 30b of the fifth pipe portion 30 can be configured to connect the piping that supplies heated water to the heat exchanger(s) 60. An air scoop or air separator 50 (see, e.g., FIG. 5) can be located within the fifth pipe portion 30 and/or fluidly attached to the second end 30b of the fifth pipe portion 30b. The air scoop 50 can be fluidly connected to an expansion tank 52. A boiler kit or water fill kit 54 can be fluidly connected to the air scoop 50 and/or the expansion tank 52. The boiler kit 54 can include a backflow preventer 56 and a boiler water fill valve 58.

The fifth pipe portion 30 can be spaced-apart from both the third and fourth pipe portions 26, 28. The longitudinal axis of the fourth pipe portion 28 can extend parallel to the longitudinal axis of the fifth pipe portion 30. The fifth pipe portion 30 can include or be attached to at least one circular pump. The circular pump can force or pull water from the second pipe portion 22 to travel to the heat exchanger(s) 60.

A segment of the second pipe portion 22 can serve as primary/secondary hydraulic separation between the boiler (s) and the system 10. In one embodiment, such those shown in FIGS. 2 and 3, a segment 38 of the second pipe portion 22 allows water exiting the first end 28a of the fourth pipe portion 28 to mix with water or fluid traveling in the second pipe portion 22, thereby raising the temperature of the water or fluid traveling in the second pipe portion 22 before traveling to the heat exchanger(s). Primary/secondary hydraulic separation accommodates or allows for the use of pumps with different flow rates. In other words, the closely-spaced tees allow the two pumps to work without interfering with each other.

In one embodiment, a short section of piping and a valve are located proximate the second end 20b of the first pipe portion 20. The valve, which can be referred to as a drain valve of a drip leg or sediment trap 32, can be configured to allow at least one of or both sediment and liquid to be removed from the first pipe portion 20. In operation, as fluid flows from the first end 20a to the second end 20b of the first pipe portion 20, gravity pulls the heavier or denser material (e.g., sediment) to and/or in the drip leg/sediment trap 32 to the drain valve. In one embodiment, the drain valve can be manually opened and closed by a handle on an exterior of the drain valve. The drain valve can be located at or equivalent to the lowest point of the system 10. The drain valve allows the system 10 to be drained for repair and/or maintenance, or flushed of heavy particles, without removing any of the pipe portions 20, 22, 26, 28, 30 of the system 10.

In one embodiment, at least one port can be located at or proximate to the first end 22a of the second pipe portion 22. The port, which can be referred to as a purge/charge port or valve 34, can be configured to allow at least one of (i) gas to be removed from the second pipe portion 22 (as well as the entire system piping of the home or building), and (ii) fluid (e.g., as in a chemical cleaner in liquid form for maintenance, non-gaseous substance, concentrated gel, powder, etc.) to be added to the second pipe portion 22 (which would flow through entire system, for example, to maintain and/or achieve a desired water quality). The purge/charge port or valve 34 can include a removable fitting assembly. In one embodiment, additives can be poured into the system 10 and/or the boiler(s) 62 through the purge/charge port or valve 34. In one embodiment, air can be evacuated from the system 10 after service and/or one or more repair procedures.

In one embodiment, at least one port can be located at or proximate to the second end 28b of the fourth pipe portion 28. The port, which can be referred to as a boiler purge/flush port 42 (see, for example, FIGS. 2 and 3), can be configured to allow material to be introduced into or removed from the fourth pipe portion 28. By utilizing the sediment trap 32 and the boiler purge/flush port 42, one or more chemical cleaners can be introduced inside of the boiler(s) 62 by pumping the cleaner(s) in one of these valves and out of the other.

In one embodiment for large mass systems (e.g., cast iron boilers), the second pipe portion 22 can include at least one tuning valve. The tuning valve can enable adjustability of a standard boiler to fit into the building piping system and allow the boiler to maintain preferred operating temperature(s) without risk of damaging the boiler with low return water temperatures.

The system 10 can include a plurality of spaced-apart isolation valves 44, such as ball valves, gate valves, etc., to allow selective closing of portions of the system 10 for repair and/or cleaning purposes. For example, an isolation valve 44 can be located at or proximate to the first end 20a of the first pipe portion 20, which thereby allows an installer, repairer or user to permit or prevent water from flowing from the heat exchanger(s) 60 back to the first pipe portion 20 of the system 10. In one embodiment, each of the third, fourth and fifth pipe portions 26, 28, 30 include an isolation valve 44 therein or attached thereto, which allows an installer, repairer or user to permit or prevent water from flowing from the system 10 to the boiler(s) 62 and/or the heat exchanger(s) 60 in the building.

In operation, as generally shown in FIG. 1, relatively cold water can be introduced into the first end 20a of the first pipe portion 20. This relatively cold water can be returning to the boiler(s) 62 from the heat exchanger(s) 60 typically located in other parts or rooms of the building. The water can travel down the first pipe portion 20 to the second end 20b and into and through the swing joint 40 and into the second pipe portion 22 through the second end 22b thereof. Any particles or sediment can settle in or near the drain valve 32, and be removed from the system 10 at that time or at a later time. The water can travel (or be forced by at least one pump, for example) up the second pipe portion 22 and into the third pipe portion 26 through the first end 26a thereof. Once inside the third pipe portion 26, the water can travel to and into the boiler(s) 62, whereby heat is applied to the water such that the temperature of the water increases. The water can then exit the boiler(s) 62 through the second end 28b of the fourth pipe portion 28, and travel to the first end 28a of the fourth pipe portion 28. The heated water would then enter the second pipe portion 22 (e.g., above where the third pipe portion 26 connects to the second pipe portion 22) and mix with the cooler water and increase the overall temperature of the water. The water (or at least some water) exiting the fourth pipe portion 28 can travel downwardly (at least slightly) in the second pipe portion 22 and renter the third pipe portion 26 and then reenter the boiler(s) 62 in order to separate the possible pumping power differences of the at least two pumps (boiler pump and system pump). The water can follow this path (i.e., third pipe portion 26, boiler(s) 62, fourth pipe portion 28, mix in pipe portion 22, and so on) until the temperature of the water reaches a predetermined value or range. The heated water in the fifth pipe portion 30 can eventually travel (or be forced by at least one pump, for example) to the heat exchanger(s) 60. The above-described process can continue as long as it is desirable to provide heated water to the heat exchanger(s). The term "water" is broadly defined herein to include other fluids. For example, some systems could use a 30-50% glycol mixture in the system as the heating medium.

As shown in FIGS. 7-12, at least portions or the entirety of the system 10 can be supplied as a kit. The kit can reduce installation error and reduce costs. The kit can include at least the fittings and components of the first pipe portion 20, the second pipe portion 22, the third pipe portion 26, the fourth pipe portion 28 and/or the fifth pipe portion 30, one or more swing joints 40 and one or more ball-valves 44 (or isolation valves). Installation instructions can be included in the kit to allow the installer to relatively quickly and more easily build a properly set-up a near-boiler piping system 10.

Figure 8A:
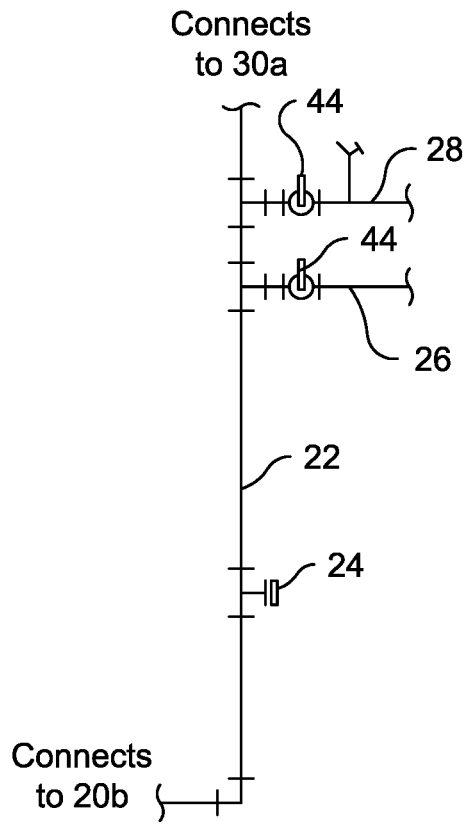
FIG. 8A is an enlarged schematic diagram of a boiler arm assembly according to a first embodiment, wherein the boiler arm of the first embodiment can form at least a component of the kit.
Figure 8B:
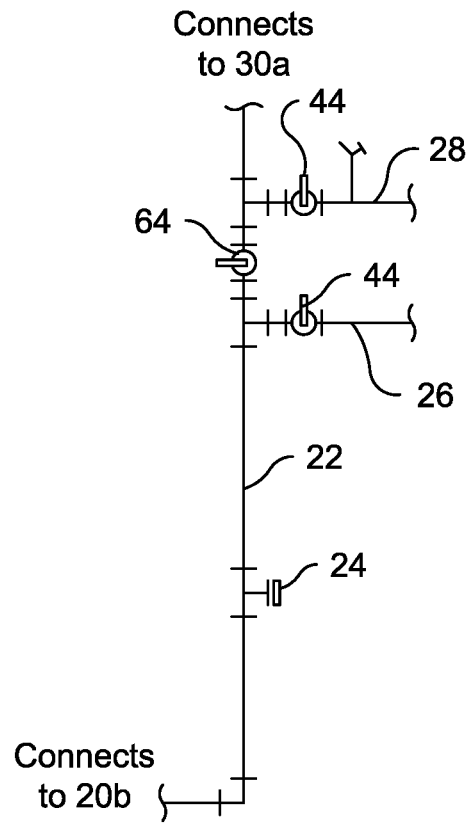
FIG. 8B is an enlarged schematic diagram of a boiler arm assembly according to a second embodiment of the presently disclosed technology, wherein the boiler arm of the second embodiment can form at least a component of the kit.
Figure 8C:
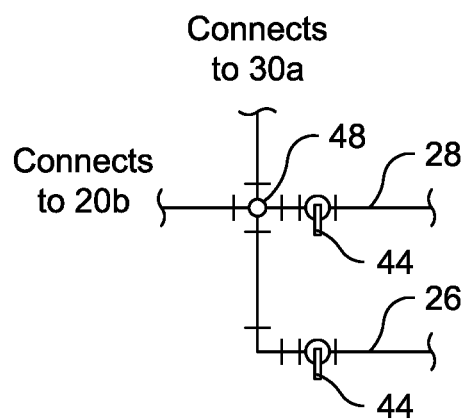
FIG. 8C is an enlarged schematic diagram of a boiler arm assembly according to a third embodiment of the presently disclosed technology, wherein the boiler arm of the second embodiment can form at least a component of the kit.
Figure 9:
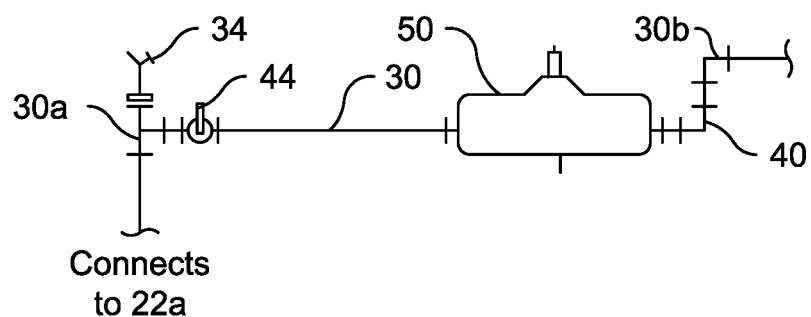
FIG. 9 is an enlarged schematic diagram of a component manifold assembly, which can form at least a component of the kit.
Figure 10:
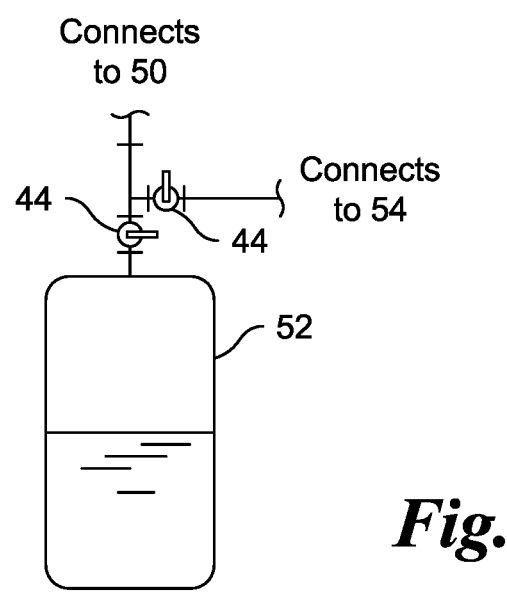
FIG. 10 is an enlarged schematic diagram of an expansion tank assembly, which can form at least a component of the kit.
Figure 11:
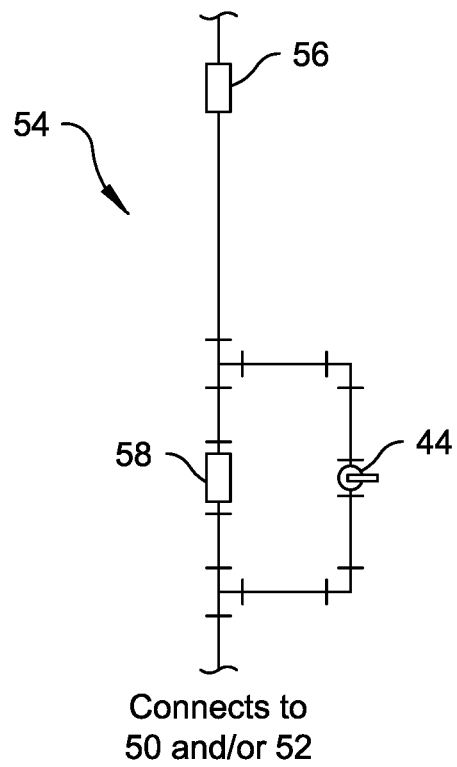
FIG. 11 is an enlarged schematic diagram of a boiler or water fill assembly, which can form at least a component of the kit.

In one embodiment, depending on the particular application and/or building configuration, a person or installer would choose between or among the first, second and third embodiments of the boiler arm assembly (see FIGS. 8A, 8B and 8C, respectively). Then, one or more of the other components or assemblies (see, e.g., FIGS. 7 and 9-12) could be added or attached thereto (either directly or indirectly) to form a system 10 having a configuration or set-up that is most desirable for the building and/or the heating needs.

Figure 6:
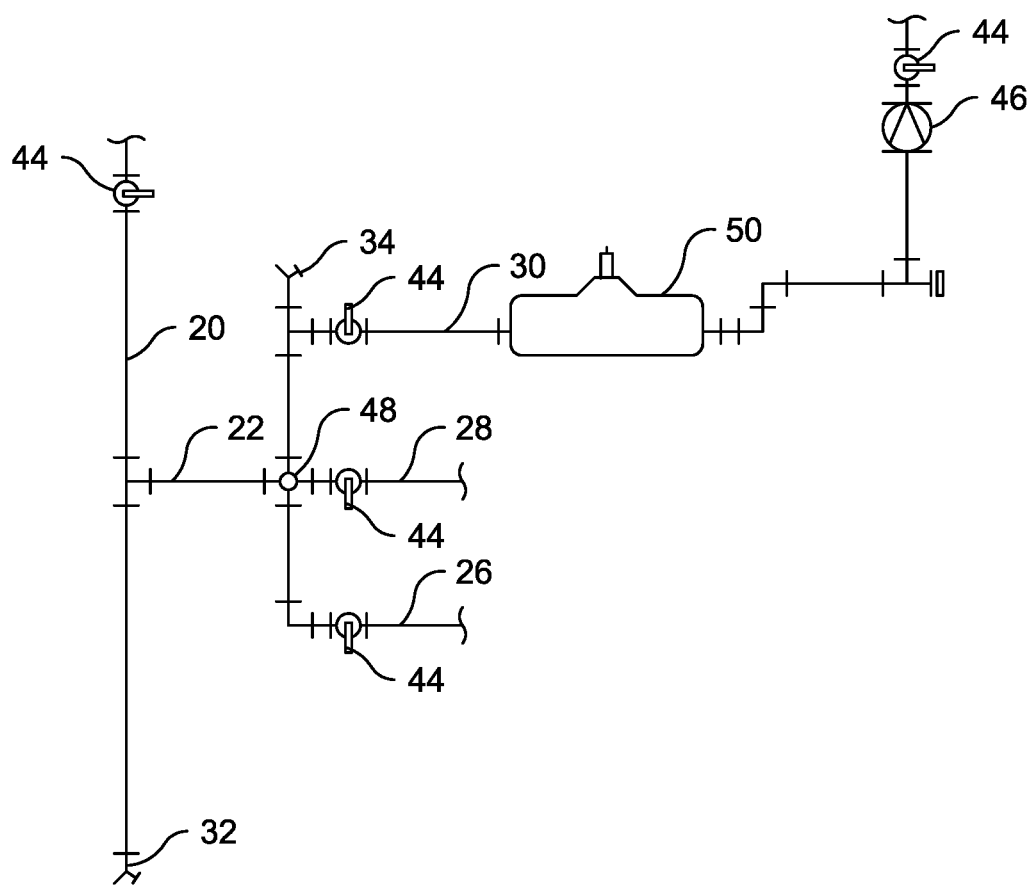
FIG. 6 is a schematic diagram of at least a portion of a system or apparatus according to an embodiment of the present disclosure, wherein a motorized, 4-way mixing valve is utilized.
Figure 7:
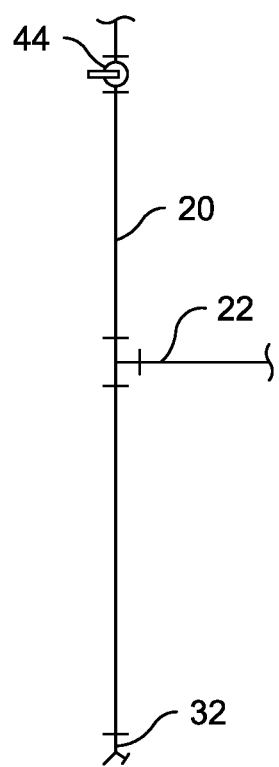
FIG. 7 is an enlarged schematic diagram of a return drop assembly, which can form at least a component of a kit according to an embodiment of the present disclosure.

In one embodiment, the presently disclosed technology is constructed in such a manner so that it has the ability to utilize many different manufactured components to form a versatile and complete connection kit for any boiler application. For example, in one version of a manifold boiler arm kit, as shown in FIGS. 6 and 8C, the component(s) that forms or is/are the hydraulic separation between the boiler and the building is replaced with a motorized valve 48, such as a 4-way mixing valve. The valve 48 can be configured to automatically adjust the temperature of the heated water going to the radiators in the building. In one embodiment, the valve 48 can be set or programmed to a fixed temperature setting or operate resetting the temperature requirement going to the building based on the temperature outside. The valve 48 can allow the boiler to operate at its required temperatures and can allow for the cooled return water to mix with the heated water from the boiler to get a lower water temperature out to the building when less heat is needed. This enables a standard cast iron boiler to operate at a higher performance, save energy and/or improve comfort with lower installation costs.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A sealed heating system for a building, the heating system being under pressure and comprising:
a first pipe portion having a first end, an opposing second end, and a longitudinal axis extending therebetween, the first end of the first pipe portion being configured to connect to piping that returns water from a heat exchanger in a building to a pressurized hot water boiler in the building, the longitudinal axis of the first pipe portion extending vertically;
a second pipe portion having a first end, an opposing second end, and a longitudinal axis extending therebetween, the first end of the second pipe portion being configured to connect to piping that supplies water to the heat exchanger, the second end of the second pipe portion being connected to the second end of the first pipe portion, the longitudinal axis of the second pipe portion extending parallel to the longitudinal axis of the first pipe portion, the second pipe portion being laterally spaced-apart from the first pipe portion;
a first pump within, attached to, or fluidly connected to the second pipe portion;
a valve located in or proximate to the second end of the first pipe portion, the valve being configured to allow sediment to be flushed from the first pipe portion; and
a port located proximate the first end of the second pipe portion, the port being configured to allow at least one of (i) gas to be removed from the second pipe portion and (ii) fluid to be added to the second pipe portion,
wherein the connection of the first pipe portion to the second pipe portion is configured to allow the first pipe portion to be adjusted with respect to the second pipe portion about a vertical axis.

2. The heating system of claim 1, further comprising:
a third pipe portion having a first end, an opposing second end, and a longitudinal axis extending therebetween, the first end of the third pipe portion being configured to connect to the second pipe portion, the second end of the third pipe portion being configured to connect to the boiler;
a fourth pipe portion having a first end, an opposing second end, and a longitudinal axis extending therebetween, the first end of the fourth pipe portion being configured to connect to the second pipe portion, the second end of the fourth pipe portion being configured to connect to the boiler, the fourth pipe portion being spaced-apart from the third pipe portion;
a fifth pipe portion having a first end, an opposing second end, and a longitudinal axis extending therebetween, the first end of the fifth pipe portion being configured to connect to the first end of the second pipe portion, the second end of the fifth pipe portion being configured to connect the piping that supplies heated water to the heat exchanger, the fifth pipe portion being spaced-apart from both the third and fourth pipe portions; and
a second pump within or attached to the fifth pipe portion.

3. The heating system of claim 2, wherein the longitudinal axis of the third pipe portion extends parallel to the longitudinal axis of the fourth pipe portion.

4. The heating system of claim 3, wherein the longitudinal axis of the third pipe portion extends perpendicularly to the longitudinal axis of the second pipe portion.

5. The heating system of claim 3, wherein the longitudinal axis of the fourth pipe portion extends parallel to the longitudinal axis of the fifth pipe portion.

6. The heating system of claim 1, wherein the second pipe portion includes a connection tap between the first and second ends thereof.

7. The heating system of claim 1, wherein the first pipe portion, the second pipe portion and installation instructions are included in a kit.

8. A sealed heating system for a building, the heating system being under pressure and comprising:
at least one heat exchanger within a first room of a building;
a pressurized hot water boiler in a second room of the building, the boiler being configured to heat water;
a first pipe portion having a first end, an opposing second end, and a longitudinal axis extending therebetween, the first end of the first pipe portion connected to piping that returns water from the at least one heat exchanger to the boiler, the longitudinal axis of the first pipe portion extending vertically;
a second pipe portion having a first end, an opposing second end, and a longitudinal axis extending therebetween, the first end of the second pipe portion being connected to piping that supplies water to the at least one heat exchanger from the boiler, the second end of the second pipe portion being at least indirectly connected to the second end of the first pipe portion, the longitudinal axis of the second pipe portion extending parallel to the longitudinal axis of the first pipe portion, the second pipe portion being laterally spaced-apart from the first pipe portion;
a first pump within, attached to, or fluidly connected to the second pipe portion;
a valve located in or proximate to the second end of the first pipe portion, the valve allowing sediment to be flushed from the first pipe portion; and
a port located proximate the first end of the second pipe portion, the port allowing at least one of (i) gas to be removed from the second pipe portion and (ii) fluid to be added to the second pipe portion,
wherein the connection of the first pipe portion to the second pipe portion allows the first pipe portion to be adjusted during assembly with respect to the second pipe portion about a vertical axis.

9. The heating system of claim 8, wherein the heat exchanger is one of a radiator, a convection wall-baseboard heater, and a forced air coil unit.

10. The heating system of claim 9, wherein the boiler is one of a modulating condensing boiler and a large mass cast iron boiler.

11. The heating system of claim 10, further comprising:
a third pipe portion having a first end, an opposing second end, and a longitudinal axis extending therebetween, the first end of the third pipe portion connected to the second pipe portion, the second end of the third pipe portion connected to the boiler;
a fourth pipe portion having a first end, an opposing second end, and a longitudinal axis extending therebetween, the first end of the fourth pipe portion connected to the second pipe portion, the second end of the fourth pipe portion connected to the boiler;

a fifth pipe portion having a first end, an opposing second end, and a longitudinal axis extending therebetween, the first end of the fifth pipe portion connected to the first end of the second pipe portion, the second end of the fifth pipe portion connected the piping that supplies heated water to the at least one heat exchanger; and a second pump within or attached to the fifth pipe portion.

12. The heating system of claim 11, wherein the fourth pipe portion being spaced-apart from the third pipe portion, and wherein the fifth pipe portion being spaced-apart from both the third and fourth pipe portions.

13. The heating system of claim 12, wherein a temperature of water within the third pipe portion is less than a temperature of water in the fourth pipe portion.

14. The heating system of claim 13, wherein the second pipe portion includes a connection tap between the first and second ends thereof.

15. The heating system of claim 14, wherein the longitudinal axis of the third pipe portion extends parallel to the longitudinal axis of the fourth pipe portion, wherein the longitudinal axis of the third pipe portion extends perpendicularly to the longitudinal axis of the second pipe portion, and wherein the longitudinal axis of the fourth pipe portion extends parallel to the longitudinal axis of the fifth pipe portion.

16. A sealed heating system for a building, the heating system being under pressure and comprising:

a first pipe portion having a first end, an opposing second end, and a longitudinal axis extending therebetween, the first end of the first pipe portion being configured to connect to piping that returns water from a heat exchanger in a building to a pressurized hot water boiler in the building, the longitudinal axis of the first pipe portion extending vertically or at least substantially vertically;

a second pipe portion having a first end, an opposing second end, and a longitudinal axis extending therebetween, the first end of the second pipe portion being connected to piping that supplies water to the heat exchanger, the second end of the second pipe portion being connected to the second end of the first pipe portion, the longitudinal axis of the second pipe portion extending parallel or at least substantially parallel to the longitudinal axis of the first pipe portion, the second pipe portion being laterally spaced-apart from the first pipe portion; and a valve located in or proximate to the second end of the first pipe portion.

17. The heating system of claim 16, wherein a short section of piping and the valve are configured to trap particles of sediment or allow sediment to be flushed from the first pipe portion as part of maintenance to keep damaging particles from accumulating within susceptible components.

18. The heating system of claim 17, further comprising:

a port located proximate the first end of the second pipe portion, the port being configured to allow at least one of (i) gas to be removed from the second pipe portion and (ii) fluid to be added to the second pipe portion.

19. The heating system of claim 18, wherein the connection of the first pipe portion to the second pipe portion is configured to allow the first pipe portion to move with respect to the second pipe portion about a vertical axis.

20. The heating system of claim 19, further comprising:

a 4-way mixing valve automatically adjusts the temperature of heated water going to the heat exchanger.

* * * * *